May 4, 1954              S. TRIFILETTI             2,677,578
ANTISKID DEVICE FOR AUTOMOBILE WHEELS AND THE LIKE
Filed Jan. 20, 1950             3 Sheets-Sheet 1
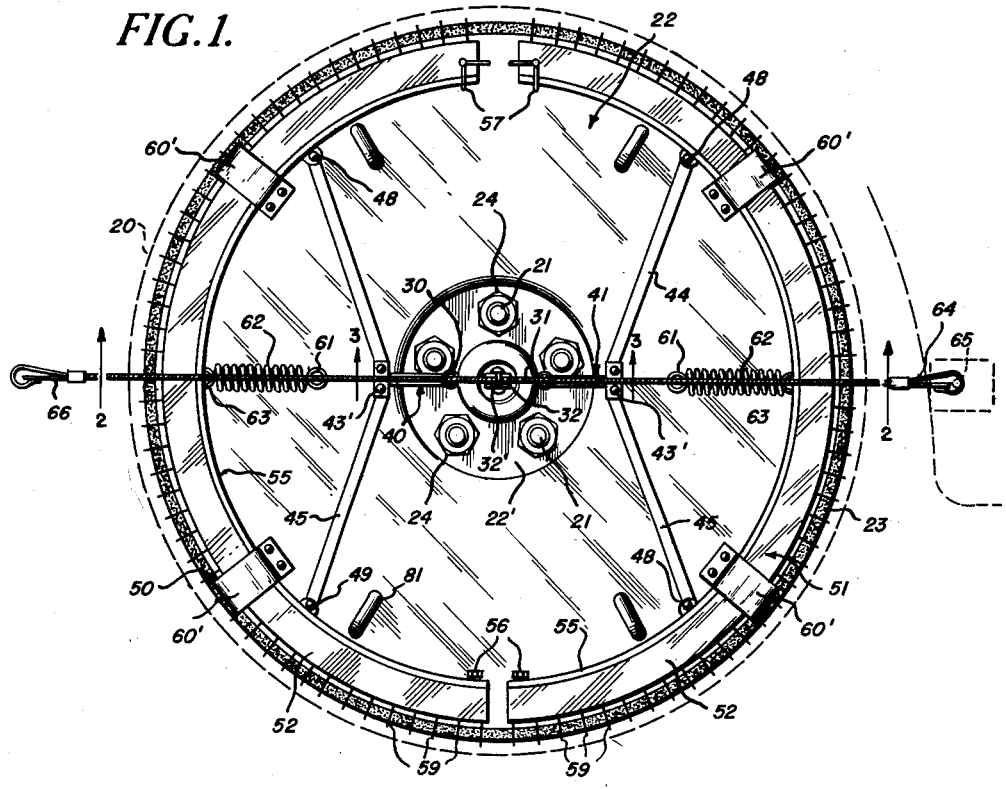
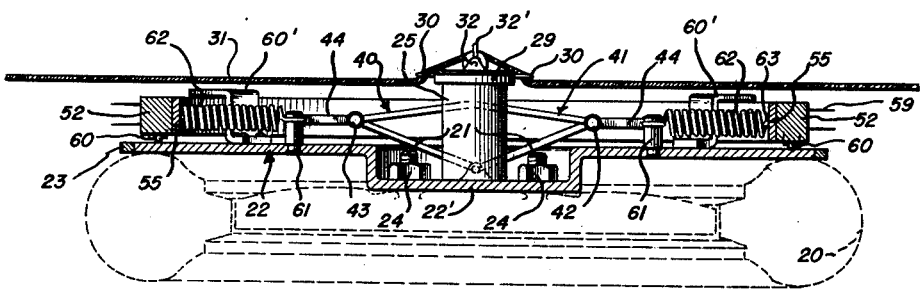
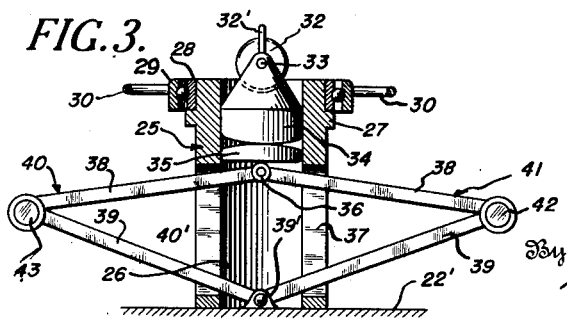
Inventor
SANTY TRIFILETTI
By McMorrow, Burman & Davidson
Attorneys May 4, 1954  S. TRIFILETTI  2,677,578
ANTISKID DEVICE FOR AUTOMOBILE WHEELS AND THE LIKE
Filed Jan. 20, 1950  3 Sheets-Sheet 2
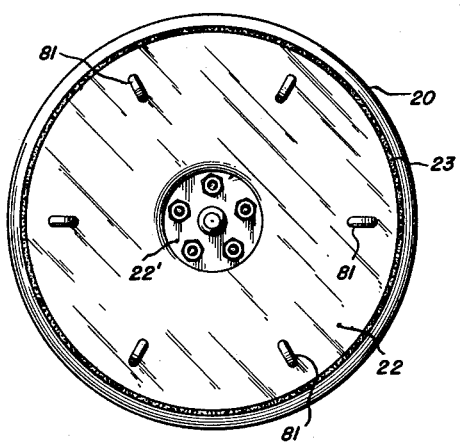
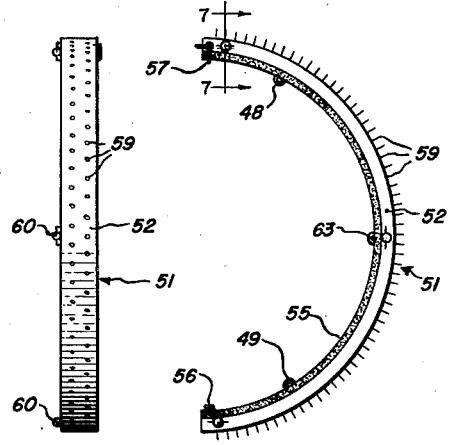
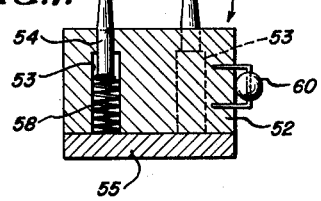
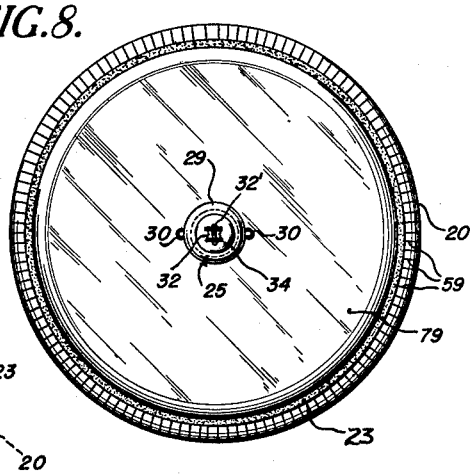
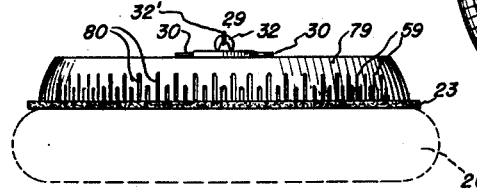
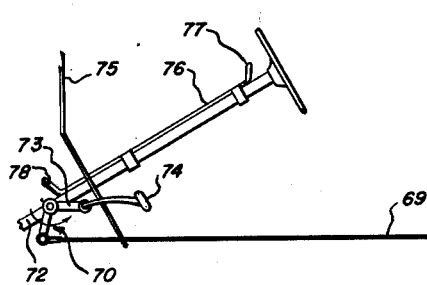
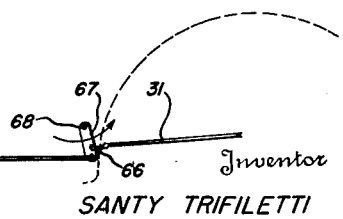
Inventor
SANTY TRIFILETTI May 4, 1954  S. TRIFILETTI  2,677,578
ANTISKID DEVICE FOR AUTOMOBILE WHEELS AND THE LIKE
Filed Jan. 20, 1950  3 Sheets-Sheet 3
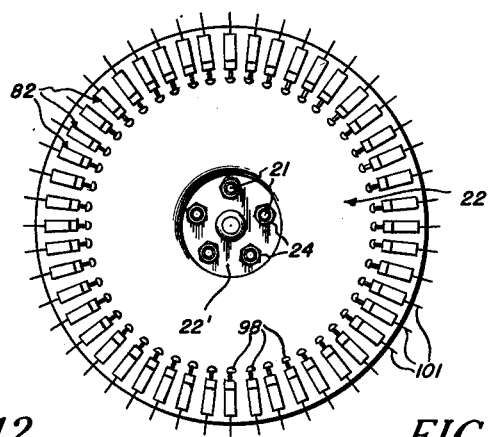
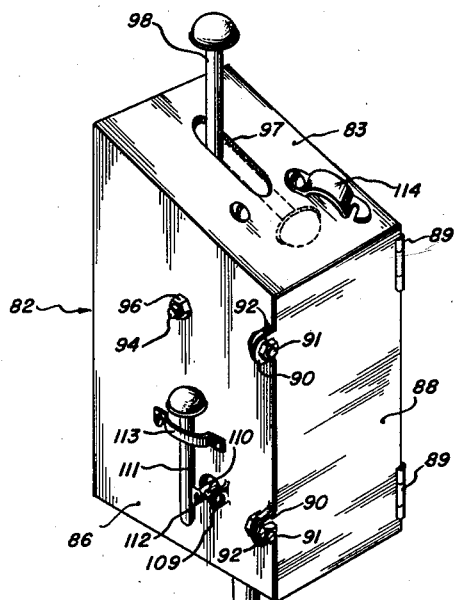
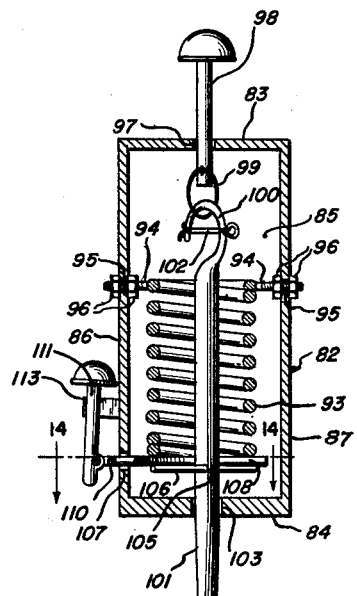
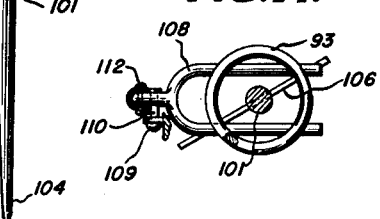
Inventor
SANTY TRIFILETTI
By McMorrow, Berman & Davidson
Attorneys Patented May 4, 1954

2,677,578

UNITED STATES PATENT OFFICE 2,677,578

ANTISKID DEVICE FOR AUTOMOBILE WHEELS AND THE LIKE

Santy Trifiletti, Castleton, N. Y.

Application January 20, 1950, Serial No. 139,590

3 Claims. (Cl. 301—47)

My invention relates to an anti-skid attachment for automobile wheels and the like.

A primary object of the invention is to provide an anti-skid device to be mounted upon the outer side of an automobile wheel in such a manner that it is unnecessary to jack up the car when applying the device.

A further object is to provide an anti-skid device of the above-mentioned character, which is secured to the usual wheel attaching screw-threaded studs carried by the brake drums.

A further object is to provide an anti-skid device of the above-mentioned character which will require less time and effort to apply to the wheel of the automobile than the conventional skid chains.

A further object is to provide an anti-skid attachment for automobile wheels and the like, including means operable from the driver's seat to render the device operative and inoperative.

A further object is to provide a device of the above-mentioned character wherein there is no place for water to accumulate, so that the device will freeze.

A still further object is to provide a device of the above-mentioned character which is simplified, compact, sturdy and relatively inexpensive to manufacture.

Other objects and advantages of the invention will be apparent during the course of the following description.

In the accompanying drawings forming a part of this application, and in which like numerals are employed to designate like parts throughout the same:

Figure 1 is a side elevation of an automobile wheel equipped with the anti-skid device embodying my invention, the device being shown in the inoperative position, parts omitted;

Figure 2 is a central vertical section taken on line 2—2 of Figure 1;

Figure 3 is an enlarged fragmentary vertical section taken on line 3—3 of Figure 1, parts omitted;

Figure 4 is a side elevation of the wheel shown in Figure 1, drawn on a reduced scale, and having a mounting disc applied thereto;

Figure 5 is a side elevation of anti-skid block removed;

Figure 6 is a side elevation of the same as viewed from the right side of Figure 5;

Figure 7 is an enlarged transverse section taken on line 7—7 of Figure 6;

Figure 8 is a side elevation of the wheel equipped with the complete device, parts being shown in their operative positions;

Figure 9 is a side elevation of the device as illustrated in Figure 8;

Figure 10 is a side elevation of operating mechanism for the device;

Figure 11 is a side elevation of an automobile wheel equipped with anti-skid devices embodying a modification of my invention;

Figure 12 is an enlarged perspective view of one of the anti-skid devices removed;

Figure 13 is a central vertical longitudinal section through the device shown in Figure 12; and Figure 14 is a transverse horizontal section taken on line 14—14 of Figure 13.

In the drawings where, for the purpose of illustration, are shown preferred embodiments of my invention, attention is directed first to Figures 1 to 10, inclusive, wherein the numeral 20 designates a conventional pneumatic tired automobile wheel. The wheel 20 is rigidly secured to the brake drum of the automobile by the usual screw-threaded studs 21, the brake drum being omitted from the drawings. Rigidly mounted upon the outer face of the wheel 20 is a generally flat, circular disc or plate 22, having a diameter slightly smaller than that of the tired wheel 20, and capped with a marginal rubber bead or tire 23 rigidly secured thereto. The diameter of the bead 23 is also slightly smaller than the outside diameter of the wheel 20 when the tire of such wheel is properly inflated. The disc 22 is recessed or dished near its center, as shown at 22', and provided with a group of openings in the dished portion arranged to receive the studs 21 therein. The disc is rigidly clamped against the outer side of the wheel by the usual nuts 24 mounted upon the studs 21, as shown.

Rigidly secured to the recessed or dished portion 22' at the center of the same and inwardly of the studs 21 by means of welding or the like is an axially outwardly extending, tubular hub or sleeve 25. The sleeve 25 has a smooth bore 26 and is provided near and inwardly of its outer end with an annular ring or shoulder 27. This shoulder 27 forms a seat for the inner race 28 of a ball bearing, including an outer race 29. Rigidly secured to the outer race 29 at diametrically opposite points are eyelets or rings 30 for the reception of a cable 31. The cable 31 is threaded through both eyelets 30, as shown in Figure 2, and passes over a small grooved pulley or roller 32, rotatably mounted upon a pin or shaft 33. A small guide ring 32' is provided for maintaining the cable in the pulley groove. The pin 33 is carried by a plunger or block 34 which may be tapered at its outer end, as shown in Figure 3. The plunger 34 is mounted within the bore 26 for reciprocation and is held within the bore by the cable 31, as will be more fully described. Mounted within the bore 26 for reciprocation, and arranged inwardly of the plunger 34, is a small plunger or plate 35 having knuckles 36 secured to its inner face.

Inwardly of the element 35, the sleeve 25 is provided in its side with aligned slots 37 receiving therein the opposed links 38 and 39 of toggles 40 and 41. The toggles 40 and 41 extend radially outwardly of the sleeve 25 and lie close to the outer face of the disc 22, as shown. The inner ends of the outermost links 38 of the toggles are pivotally connected with the knuckles 36 of the plunger section or plate 35. The inner ends of the inner links 39 are pivotally connected, as shown at 40', with an apertured lug 39' rigidly secured to the recessed portion 22'. The links 39 are longer than the links 38, as shown. The outer ends of the links 39 and 38 of each of the toggles are pivotally connected with pins or blocks 42 and 43 which lie adjacent to the outer face of the disc 22 radially outwardly of the recessed or dished portion 22'. The toggles 40 and 41 operate in a plane perpendicular to the disc 22. Pivotally secured to the opposite ends of the blocks 42 and 43, as shown at 43', are generally radially extending links 44 and 45 which lie in planes parallel to the disc 22 and arranged at right angles to the plane of the toggles 40 and 41.

The outer ends of the links 44 and 45 are pivotally connected, as at 48 and 49, with separate semicircular blocks or pin housings 50 and 51. The pin housings 50 and 51 comprise elongated semicircular blocks or body portions 52 having laterally spaced rows of longitudinally spaced radial openings or bores 53 formed therein. The bores 53 extend through the inner sides of the blocks 52 and lead into reduced bores 54 which extend through the outer faces of the blocks 52. Removable semicircular plates or cover 55 are provided for the inner sides of the blocks 52 and pivotally connected, as at 56, with one adjacent pair of ends of the blocks 52. The covers 55 are detachably connected with the blocks 52 near their opposite ends by means of pivoted catches or keepers 57, carried by the blocks 52. The covers 55 serve to cover the open ends of the bores 53. Mounted within each bore 53 is a compressible coil spring 58 having secured to its outer end a tapered sharp pin or prong 59, which operates through the reduced bores 54. The springs 58 retain the pins 59 within their bores 54 and permit the pins to yieldingly move into the bores 53. The bores 53 and pins 59 of each row are preferably staggered, as shown in Figure 5. The semicircular pin housings 51 lie adjacent to the outer face of the flat disc 22 and are provided upon their inner sides with a plurality of small rollers or balls 60 adapted to roll against the outer surface of the plate 22. The pin housings 50 and 51 are arranged in opposed relation, as shown in Figure 1, and are adapted to shift bodily radially toward and away from each other. Adjacent the pin housings 50 and 51, and spaced inwardly from the opposite ends of the same, pairs of Z-shaped brackets or guides 60' are rigidly mounted upon the disc 22. The tops of these Z-shaped brackets engage over the outer sides of the pin housings 50 and 51, as shown in Figure 1. The pin housings are slidable beneath the tops of the Z-shaped brackets, and the brackets serve to maintain the pin housings in rolling contact against the outer face of the disc 22, while the pin housings are being shifted radially inwardly and outwardly.

A pair of diametrically oppositely arranged upstanding pins or lugs 61 are rigidly anchored within the disc 22 at a point radially outwardly of the blocks or pins 42 and 43. The inner ends of strong retractile coil springs 62 are fixedly secured to the pins 61, as shown, and the outer ends of the springs 62 are secured to the inner sides of the covers 55, as shown at 63. The strong springs 62 serve to urge the pin housings 50 and 51 radially inwardly toward their innermost positions, shown in Figure 1. When in the innermost positions, Figure 1, the outer ends of the pins 59 will be arranged radially inwardly of the periphery of the wheel 20 and will be inoperative.

The cable 31 extends horizontally with respect to the ground, and forwardly and rearwardly of the sleeve 25, as shown. The cable extends close to the outer sides of the pin housings 50 and 51, and the rear end of the cable is equipped with a spring clasp 64 adapted to be connected with a lug or pin 65 secured to the rear side of the adjacent rear fender of the automobile, the anti-skid device being applied to the rear wheels of the automobile. The cable 31 extends forwardly to a point near the forward end of the adjacent rear automobile fender, and is equipped at this point with a second spring clasp 66 connected with a short, vertically swingable link or lever 67 pivotally connected, as at 68, with the fender. A rod or cable 69 is connected with the bottom end of the link 67, and extends forwardly longitudinally of the automobile for connection with one arm of a vertically swingable bell crank lever 70 pivotally mounted upon the steering post 72 of the automobile. The other arm 73 of the bell crank lever 70 is pivotally connected with a foot pedal 74 which operates through an opening provided in the usual forward panel or cowling 75 of the automobile. A rotatable rod 76 is mounted upon the steering post 72, and is provided with an operating handle 77 adjacent the steering wheel. At its lower end, the rod 76 has a short, transverse extension 78 for engagement above the arm 73 of the bell crank lever 70, to maintain the arm 73 in its lowered position when the pedal 74 is depressed by the operator of the automobile. The springs 62 serve to bias the rod or cable 69 to the right, and the levers 67 and 70 counterclockwise, in the direction of the arrows shown in Figure 10.

A large hub cap 79 is provided, and this hub cap engages over both of the pin housings 50 and 51, as shown. The inner edge of the hub cap 79 abuts the outer face of the disc 22, and only the rubber bead or tire 23 projects radially beyond the periphery of the hub cap, Figure 9. The hub cap 79 is provided with a series of slots 80 for receiving the pins 59 therethrough. The hub cap 79 is provided with conventional fastening means, not shown, which coact with conventional lugs 81 rigidly secured to the outer face of the disc 62 at spaced intervals. The hub cap is provided with a large central clearance opening receiving the sleeve 25 therethrough. The pulley 32 and eyelets 30 project beyond the outer face of the hub cap 79, as shown, for connection with the cable 31. The cable operates across the outer face of the hub cap. If desired, an additional small snow cap or cover may be provided upon the outer face of the hub cap 79 for engagement over the outer end of the sleeve 25 to protect the pulley 32 and associated elements from the elements.

The operation of the device, as illustrated in Figures 1 to 10, inclusive, is as follows:

With the parts assembled, as shown and described, upon the rear wheels of the automobile, the strong spring 62 will normally urge the pin housings 50 and 51 radially inwardly to their positions shown in Figure 1, where the tips of the pins 59 will be arranged radially inwardly of the periphery of the wheel 20. The links 44 and 45 will shift the pins 42 and 43 radially inwardly to spread the links 38 and 39 of the toggles 40 and 41 within the slots 37. This action forces the pulley 32 to its outermost position, and tension is accordingly applied to the cable 31. The cable being fastened at its rear end to the pin or lug 65, the lever 67 will be accordingly swung in the counterclockwise direction, Figure 10. This will bias the bell crank lever 70 in counterclockwise direction, and the pedal 74 will be held normally raised.

When it is desired to shift the anti-skid device to its operative position, the pedal 74 is depressed by the driver. This swings the bell crank lever clockwise, Figure 10, shifting the rod 69 to the left. The lever 67 will swing clockwise, pulling with it the cable 31 and applying further tension to the same. This increased tension upon the cable will force the plunger inwardly, collapsing the links of the toggles 40 and 41, the links 44 and 45 being also shifted radially outwardly in opposite directions. The pin housings 50 and 51 connected with the links 44 and 45 are not shifted outwardly radially until the points of the pins 59 project slightly beyond the periphery of the tire of the wheel 20. With the parts arranged in this position, and the pedal 74 maintained pressed by the driver, when power is applied to the rear wheels of the automobile, pins 59 will dig into the slippery substance, such as ice, and provide traction for the rear wheels. The springs 58 permit the individual pins 59 to yield radially inwardly when objects, such as stones, happen to be struck by the pins 59 as the wheel rotates. If at any time the tire of the wheel 20 should become deflated, the weight of the automobile will be carried by the disc 22, the rubber bead or tire 23 engaging the ground. Whenever it is desired to retract the pin housings 50 and 51 to their innermost positions, it is merely necessary to elevate the pedal 74, and the springs 62 will automatically return the pin housings to their innermost positions. When the wheel 20 rotates, the effect of centrifugal force upon the blocks or pin housings 50 and 51 will be such that the tension in the cable 31 is aided for forcing the plunger 34 inwardly and shifting the pin housings 50 and 51 radially outwardly.

The linkage system shown in Figure 10 of the drawings may form a permanent attachment for the automobile. The remainder of the device, as illustrated in Figure 1, and including the cable 31, may be conveniently applied to the wheel of the vehicle in times of emergency. If desired, the entire device may form a permanent part of the automobile.

In Figures 11 to 14 of the drawings, I have shown a modified form of my invention, wherein the anti-skid attachment is not controlled by the driver of the automobile.

As shown in Figure 11, disc 22 is applied to the outer side of the automobile wheel by means of the studs 21 and nuts 24, in the same manner as described in connection with the first form of the invention. As shown in Figure 11, a plurality of traction pin casings or boxes 82 are arranged in an annular group and near and slightly inwardly of the periphery of the disc 22, and rigidly secured to the disc by means of welding, bolts or the like. The casings 82 are spaced apart circumferentially equidistantly, as shown.

Each casing or box 82 is rectangular and slightly elongated, as shown, and comprises a top 83, bottom 84, back or rear side 85 and sides 86 and 87, all preferably integrally connected, as shown. The forward side of the casing 82 is open, and a flat cover or door 88 is provided for covering the forward open side of the casing. The door 88 is hingedly connected with the forward edge of the side 87, as at 89, and the opposite or free edge of the door 88 carries spaced apertured lugs 90 receiving screw-threaded studs 91 or the like which are welded, or otherwise permanently rigidly secured, to the side 86 of the casing. Nuts 92 are provided upon the studs 91 for maintaining the door 88 securely closed. When the casings or boxes 82 are secured to the disc 22, Figure 11, the doors 88 are arranged outermost or remote from the disc 22, the rear sides 85 of the casings lying flat against the disc 22.

Mounted within each casing 82 and arranged substantially centrally therein and extending longitudinally of the casing is an expansible coil spring 93 having a pair of diametrically oppositely disposed, radially extending arms or rods 94 permanently rigidly secured to its innermost end by welding or the like. The outer ends of the rods 94 are screw-threaded for engagement within openings 95 formed in the sides 86 and 87 of the casing 82.

Lock nuts 96 are mounted upon the screw-threaded ends of the rods 94 inwardly and outwardly of the sides 86 and 87, as shown. When the casings or boxes 82 are mounted upon the disc 22, Figure 11, the ends 83 of the casings and the ends of the springs 93 having the rods 94 secured thereto are disposed radially innermost. The inner ends 83 of the casings are provided with elongated openings or slots 97 receiving therein handle pins 98 which extend through the ends 83 and into the casings. Each handle pin 98 has a chain link or ring 99 pivotally secured to its end within the casing, and a hooked extension 100 of a traction pin or element 101 engages through the ring 99 and is secured thereto by a screw, cotter pin or the like 102, as shown. The traction pin 101 is elongated and extends entirely through the bore of the spring 93 and beyond the outer end of the spring, and through an opening 103 formed centrally in the outer end 84. The outermost or free end of each traction pin 101 is pointed, as at 104, and these pointed ends 104 project radially beyond the outer ends 84 for a substantial distance and radially beyond the peripheries of the disc 22 and pneumatic tire 20 when in the operative position.

Each traction pin 101 is provided near its longitudinal center with a transverse opening 105 within which is securely mounted a transversely extending pin 106 projecting laterally beyond opposite sides of the traction pin. The pin 106 is disposed beyond the outer end of the spring 93, as shown. Adjacent to the pin 106, the side 86 is provided with an opening 107 receiving therein a transversely extending, forked lifting lever 108, the inner end of which straddles the traction pin 101 and is disposed between the pin 106 and adjacent end of the spring 93. An apertured lug 109 is welded or otherwise rigidly secured to the side 86 adjacent to one side of the opening 107, and a pivot pin or bolt 110 extends through the forked lifting lever 108 adjacent to its outer end and through the apertured lug 109 for pivotally mounting the lifting lever upon the side 86 of the casing. The arrangement is such that the forked lifting lever 108 may swing upon the pin or bolt 110 for lifting the coil spring 93 from the transverse pin 106.

The lifting lever 108 projects slightly beyond the outer face of the side 86, as shown, and the lifting lever is provided with a handle extension 111 hingedly connected at 112 with the outer end of the lifting lever. When in the inoperative position, the extension 111 lies flat against the outer face of side 86 and is held thereagainst by a clip 113, permanently secured by welding or the like to the side 86. The handle extension 111 may be extended or swung longitudinally of the lifting lever 108 for providing the necessary leverage to swing the lifting lever 108 upon the bolt or pin 110 for lifting the coil spring 93. The lifting lever 108 is provided to facilitate assembling and disassembling of the elements within the casing 82, and in this connection, it may be necessary to change or replace the traction pins 101 when their points 104 become worn. When the lifting lever 108 is utilized for lifting the spring 93 away from the transverse pin 106, such pin can be readily removed from the opening 105 when the door 88 is opened.

In Figures 12 and 13, as well as Figure 11, the traction pins 101 are shown in their extended or operative positions, wherein the points 104 project radially beyond the periphery of the pneumatic tire. In such operative positions, the traction pins will engage the ice or snow on the ground to provide the necessary traction to prevent skidding of the wheels. When it is desired to retract the traction pins 101 to their inoperative positions, wherein the points 104 are disposed radially inwardly of the periphery of the tire 20, it is merely necessary to grasp and swing the pins 98 within the slots 97, such pins fulcruming or pivoting about the edges of the slots for pulling the hooked extensions 109 radially inwardly toward the inner ends 83. This, of course, retracts the entire traction pin 101, compressing the spring 93. When the pins 101 are retracted, the handle pins 98 lie flat upon the ends 83 of the casings, and are secured in place upon such ends by suitable clamps 114. Whenever it is desired to return the traction pins 101 to their radially extended or operative positions, it is merely necessary to release the pins 98 from beneath the clamps 114 and the expansible coil springs 93 will automatically shift the traction pins 101 radially outwardly into their operative positions, the pins 98 being freely swingable through the slots 97.

It is to be understood that the forms of my invention herewith shown and described are to be taken as preferred examples of the same, and that various changes in shape, size and arrangement of parts may be resorted to without departing from the spirit of the invention or the scope of the subjoined claims.

Having thus described my invention, I claim:

1. An anti-skid attachment for an automobile wheel having a pneumatic tire and studs for mounting the wheel on the axle of an automobile, said attachment comprising a flat circular disc mounted upon the outer face of the wheel and having openings formed therein to receive the studs, a plurality of housings arranged in a circle on the outer surface of the disc at the periphery thereof, traction pins slidably mounted in the housings for axial movement through one end thereof, one end of each pin projecting radially beyond the periphery of the wheel, the other end of each pin being enclosed within said housing, spring means operatively housed in each of said housings for urging the pins outwardly therefrom, withdrawing means movable through the opposing end of each housing for withdrawing the pins into inoperative positions in the housings against the urgement of the springs, means enclosed within said housings for universally connecting said withdrawing means to said other end of each pin, and means for engaging and latching said withdrawing means to lock the pins in withdrawn positions, said last means including pivoted latches mounted on the housings and movable into and out of engagement with said withdrawing means.

2. In an anti-skid attachment for an automobile, a housing having opposing end walls, said end walls being formed with aligned openings, a traction pin mounted in said housing for axial movement of one end of said pin through the opening in one of the end walls, the other end of said pin being enclosed within said housing, resilient means housed in the housing and operatively connected to the pin for urging said pin outwardly through the said end wall, a member slidably disposed through the opposing end wall of the housing, universal means connecting the member to the other end of said pin within said housing, said member having an end thereof projecting beyond the housing and adapted to be manually pulled to withdraw the pin to an inoperative position against the urgement of the spring, said member being adapted to be completely removed from the housing and extended at right-angles to the pin and pivoted latching means carried by the end wall of the housing and engageable with the member in said removed and extended position to lock the pin in an inoperative position.

3. In an anti-skid attachment for an automobile, a housing having opposing end walls, said end walls being formed with aligned openings, a traction pin mounted in said housing for axial movement of one end of said pin through the opening in one of the end walls, the other end of said pin being enclosed within said housing, resilient means housed in the housing and operatively connected to the pin for urging said pin outwardly through the said end wall, a member slidably disposed through the opposing end wall of the housing, universal means within said housing connecting the member to the other end of said pin within said housing, said member having a portion thereof projecting beyond the housing and adapted to be manually pulled to withdraw the pin to an inoperative position against the urgement of the spring, said member being adapted to be completely removed from the housing and extended at right angles to the pin, and pivoted latching means carried by the end wall of the housing and engageable with the member in the aforesaid extended position to lock the pin in an inoperative position, said resilient means including a coiled spring concentrically disposed on the pin, a lateral projection on the pin seating one end of the spring, and means anchoring the opposing end of the spring to the housing.

References Cited in the file of this patent

UNITED STATES PATENTS

| Number | Name | Date |
|---|---|---|
| 990,005 | Rash | Apr. 18, 1911 |
| 1,142,189 | Menne | June 8, 1915 |
| 1,439,931 | Warner et al. | Dec. 26, 1922 |
| 1,482,050 | Timberlake | Jan. 29, 1924 |
| 1,890,872 | Van Kleeck | Dec. 13, 1932 |
| 1,912,714 | Lambert | June 6, 1933 |
| 2,162,643 | Schiding | June 13, 1939 |
| 2,377,923 | Cawley | June 12, 1945 |
| 2,540,382 | Sigler et al. | Feb. 6, 1951 |

FOREIGN PATENTS

| Number | Country | Date |
|---|---|---|
| 1,612 | Great Britain | July 21, 1913 |